United States Patent [19]

Iijima

[11] 3,974,720
[45] Aug. 17, 1976

[54] DOWNSHIFT CONTROL CIRCUIT FOR HYDRAULIC TRANSMISSION

[75] Inventor: Tetsuya Iijima, Tokyo, Japan

[73] Assignee: Nissan Motor Co., Ltd., Japan

[22] Filed: Apr. 4, 1975

[21] Appl. No.: 565,117

[30] Foreign Application Priority Data
Apr. 25, 1974 Japan............................. 49-45971

[52] U.S. Cl............................ 74/866; 192/4 A
[51] Int. Cl.²........................................ B60K 41/04
[58] Field of Search................. 74/846, 865, 866; 192/4 A

[56] References Cited
UNITED STATES PATENTS

| | | | |
|---|---|---|---|
| 2,878,885 | 3/1959 | Hamm | 192/4 A X |
| 2,907,423 | 10/1959 | Jaeschke | 74/866 X |
| 3,374,693 | 3/1968 | Castelet | 74/865 |
| 3,628,642 | 12/1971 | Ravenel | 74/866 X |
| 3,733,930 | 5/1973 | Mizote | 74/866 |
| 3,776,048 | 12/1973 | Enomoto et al. | 74/866 |

Primary Examiner—Benjamin W. Wyche
Assistant Examiner—Frank H. McKenzie, Jr.
Attorney, Agent, or Firm—Robert E. Burns; Emmanuel J. Lobato; Bruce L. Adams

[57] ABSTRACT

A downshift control circuit including a self-holding element is coupled through an electrohydraulic transducer to the hydraulic power transmission of a road vehicle to supply thereto a downshift signal in the form of fluid. The self-holding element is operated upon depression of the brake pedal and released upon depression of the accelerator pedal. The electrohydraulic transducer is operated by the self-holding element to apply said downshift signal once the brake pedal is depressed so that shifting point is moved to a higher speed to effect a downshift to the next lower speed. With the transmission gear at low, the braking effort of the engine is utilized to the fullest extent as an aid to the normal braking.

6 Claims, 2 Drawing Figures

3,974,720

DOWNSHIFT CONTROL CIRCUIT FOR HYDRAULIC TRANSMISSION

BACKGROUND OF THE INVENTION

The present invention relates generally to automatic power transmission and particularly to a control circuit for shifting the point of downshift to a higher speed to effect a downshift to the next lower speed.

In an automatic power transmission, it is desirable to use the engine as a brake as an aid to the normal braking because its moving parts produce friction. The magnitude of the friction increases as the engine is driven at high speed, and the maximum engine speed is obtained when the transmission gear is at low. It is therefore necessary that the transmission gear must forcibly be shifted to low when the brake pedal is depressed. When the driver wants to decelerate the vehicle, he exercises greatest care by applying brake repeatedly. It is thus necessary that once the brake is applied, the transmission gear be shifted to low and remains there until the braking is completed.

SUMMARY OF THE INVENTION

It is an object of the invention to provide a downshift circuit for a hydraulic transmission of a road vehicle which has a simple configuration and operate reliably.

Another object of the invention is to provide an automatic downshift control circuit in which an electrohydraulic transducer, controlled by a self-holding circuit upon depression of the brake pedal, automatically effects a downshift of the transmission.

Still another object of the invention is to provide an automatic downshift control circuit for a hydraulic transmission in which the electrohydraulic transducer is commonly used for kickdown operation to automatically effect a downshift of the transmission upon full depression of the accelerator pedal.

Still another object is to provide an automatic downshift control circuit for a hydraulic transmission which permits the engine to be utilized as a brake to the fullest extent as an aid to normal braking.

Briefly, the present invention provides an electronic control circuit which, in response to the depression of the brake pedal, activates a memory means such as a self-holding circuit to operate an electrohydraulic transducer which in turn provides a downshift control signal in the form of fluid to the hydraulic transmission to move the shifting point to a higher vehicle speed to effect a downshift to the next lower speed. The self-holding circuit is released upon depression of the accelerator pedal. Therefore, the transmission gear remains at low until the vehicle is started again. The control circuit is advantageously utilized for kickdown operation by the provision of a kickdown switch which is operated when the accelerator pedal is fully depressed.

BRIEF DESCRIPTION OF THE DRAWINGS

The invention is fully described in the following description with reference to the accompanying drawings, in which.

DESCRIPTION OF THE PREFERRED EMBODIMENT

Figure 1:
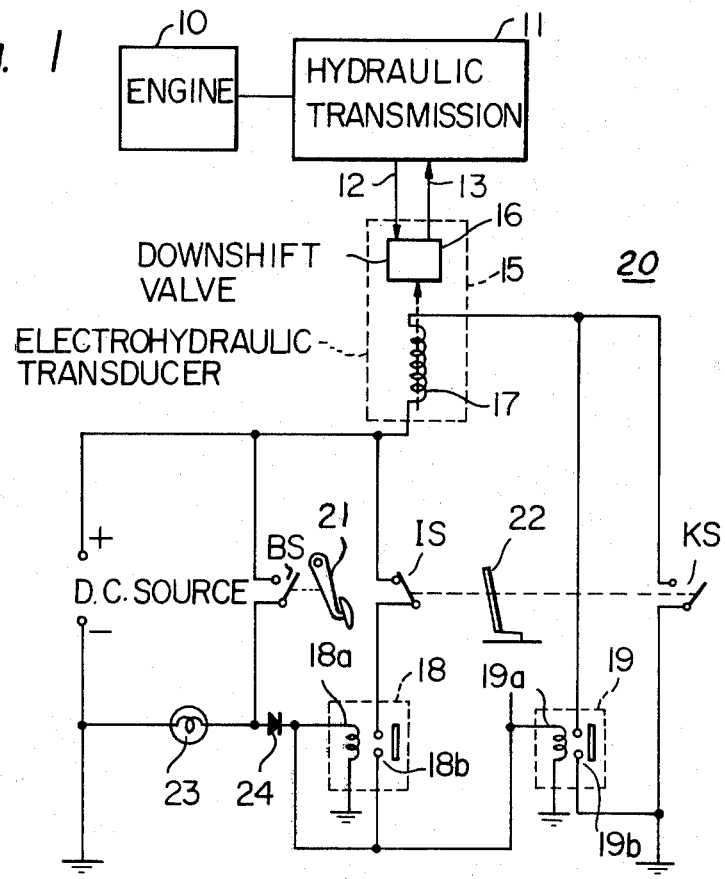
FIG. 1 is a schematic circuit diagram of a downshift arrangement of the invention for a hydraulic transmission.

Reference is now made to FIG. 1. An engine 10 of the automotive vehicle drives an automatic hydraulic transmission 11 of known construction such as disclosed in U.S. Pat. No. 3,495,481 issued to the same assignee. The transmission 11 has for each speed range, several hydraulically operable shifting means, which may include clutches and brakes for each speed. The hydraulic transmission 11 has an outlet 12 and an inlet 13 for hydraulic fluid, the outlet 12 being connected with the inlet port of a downshift valve 16 of an electrohydraulic transducer 15 and the inlet 13 being connected with the outlet port of the valve 16.

The electrohydraulic transducer 15 further includes an electromagnet or solenoid 17 which when energized operates the downshift valve 16 to provide a downshift control signal in fluid form to the hdydraulic transmission 11. The electromagnet 17 is energized under the control of a signal derived from a downshift control circuit 20.

The control circuit 20 includes a D.C. source, a brake-operated switch BS, an idling switch IS and a kickdown switch KS and electromagnetic relays 18 and 19. The brake switch BS is operatively connected to the brake pedal 21 to close its contacts to light up an indicating lamp 23 and couples the positive potential of the D.C. source to the electromagnetic relay coils 18a and 19a through a diode 24. Once operated by the switch BS, the relays 18 and 19 remain operated through a self-holding circuit including the normally-closed switch IS and relay contacts 18b. Relay contacts 19b complete a circuit for the electromagnet 17 which moves the downshift valve 16. The downshift valve 16 produces a downshift signal in the form of a fluid signal into the downshift inlet 13 of the transmission 11. The hydraulic downshift signal moves the shifting point to a higher speed, and effects a downshift to the next lower speed of transmission 11. Since the downshift valve 16 can produce a selected hydraulic pressure, it is possible to supply the hydraulic downshift signal directly to the hydraulic shifting means of the transmission.

The idling switch IS is a normally closed switch and operatively connected to the accelerator pedal 22 to open its contacts when the pedal 22 is depressed. This cuts off the self-holding circuit and releases the relays 18 and 19, and the circuit for activating the electromagnet 17 is disconnected. It is seen therefore that the electromagnet 17 is energized upon depression of the brake pedal 21 and deenergized upon depression of the accelerator pedal 22, provided, of course, the brake pedal is not depressed again simultaneously with the accelerator pedal.

Figure 2:
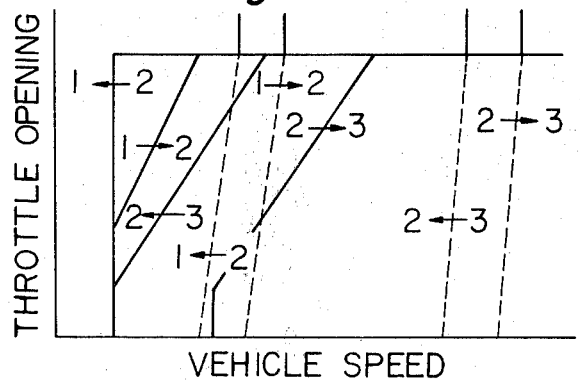
FIG. 2 is an illustration showing downshift characteristics of the hydraulic transmission plotted in the throttle opening versus vehicle speed relation.

When the vehicle cruises along a highway, the electromagnet 17 can no longer operate and the shifting points in the throttle opening versus vehicle speed relationship are as indicated by solid lines in FIG. 2 and regular shifting operations of the transmission 11 are automatically carried out. Upon depression of the brake pedal 21, the electromagnet downshift solenoid 17 operates and remains operated by the self-holding circuit including relay contacts 19b until the accelerator pedal 22 is depressed. Under this condition, the shifting points move to a higher vehicle speed side as indicated by broken lines in FIG. 2 so that a downshift to the next lower speed is effected. With the transmission at low speed gear, it is possible to utilize the braking effort of the engine 10 to the fullest extent because the moving parts of the engine produce maximum friction when driven at high speed, i.e. when the transmission 11 is at the low gear speed.

The control circuit 20 further includes a kickdown switch KS of a normally open type which is operatively coupled to the accelerator pedal 22 in such manner that it is operated only when the pedal 22 is depressed to a predetermined amount.

If the driver wishes to accelerate the car for passing a car ahead at maximum acceleration, it is necessary to effect a downshift to a lower speed to produce a maximum torque by changing the shifting point to a higher speed as is done when the brake pedal is depressed to decelerate the car to enhance the braking effort of the engine, as described above. When the accelerator pedal 22 is depressed to the predetermined amount, the kickdown switch KS is operated closing its contacts and energizes the electromagnet 17. The downshift point is thus moved to a higher speed to effect a downshift to the next lower speed.

From the above description, it will become apparent that the described embodiment comprises a normally open switch BS operated by the brake pedal 21, a normally closed switch IS operated by the accelerator pedal 22, a self-holding element or circuit which includes relays 18 and 19 with self-holding contacts 18b and 19b, the self-holding contacts 19b connecting the electromagnet 17 to the D.C. source to energize it while the self-holding element is energized to thereby supply hydraulic shifting pressure to the transmission 11, whereby the shifting point moves to a higher speed to effect a downshift to the next lower speed.

The foregoing description shows only an exemplary embodiment of the present invention. Various modifications are apparent to those skilled in the art without departing from the scope of the present invention which is only limited by the appended claims. Therefore, the embodiment shown and described are only illustrative, not restrictive.

What is claimed is:

1. A downshift control circuit for a road vehicle hydraulic transmission having a brake pedal, an accelerator pedal, and an electrohydraulic transducer including an electromagnet and a downshift valve operated by said electromagnet, means connecting the downshift valve hydraulically to said transmission for supplying thereto hydraulic shifting pressure, the downshift control circuit comprising a normally open switch operatively connected to the brake pedal, a normally closed switch operatively connected to the accelerator pedal; self-holding means comprising a self holding element energized upon operation of said normally open switch and released upon operation of said normally closed switch, said self-holding means including means coupling said electromagnet to a D.C. source to energize same while said self-holding element is energized to thereby supply said hydraulic shifting pressure to said transmission, whereby a shifting point moves to a higher speed to effect a downshift to the next lower speed.

2. A downshift control circuit as claimed in claim 1, comprising, in combination, a second normally open switch operated by said accelerator pedal when depressed to a predetermined amount to connect said electromagnet to said D.C. source to energize same.

3. A downshift control circuit as claimed in claim 1, further comprising a D.C. source for energizing said electromagnet and said self-holding element.

4. A downshift control circuit for a road vehicle hydraulic transmission having a brake pedal, an accelerator pedal, and an electrohydraulic transducer including an electromagnet and a downshift valve operated by said electromagnet, means connecting the downshift valve hydraulically to said transmission for supplying thereto hydraulic shifting pressure, said downshift control circuit comprising memory means including an electromagnet, a first contact pair operated thereby to connect said last-mentioned electromagnet to a D.C. source and a second contact pair operated thereby to connect said first-mentioned electromagnet to said D.C. source, means for connecting said electromagnet to said D.C. source to be energized upon depression of said brake pedal and means for deenergizing the electromagnet upon depression of said accelerator pedal whereby said first-mentioned electromagnet remains operated once said brake pedal is depressed until said accelerator pedal is depressed so that said hydraulic shifting pressure is supplied to said transmission to move a shifting point to a higher speed to effect a downshift to the next lower speed.

5. A downshift control circuit as claimed in claim 4, including a kickdown switch operated by said accelerator pedal when fully depressed to connect said first-mentioned electromagnet to said D.C. source.

6. A downshift control circuit as claimed in claim 5, including means connecting said kickdown switch in parallel with said second contact pair.

* * * * *